United States Patent Office 3,733,237
Patented May 15, 1973

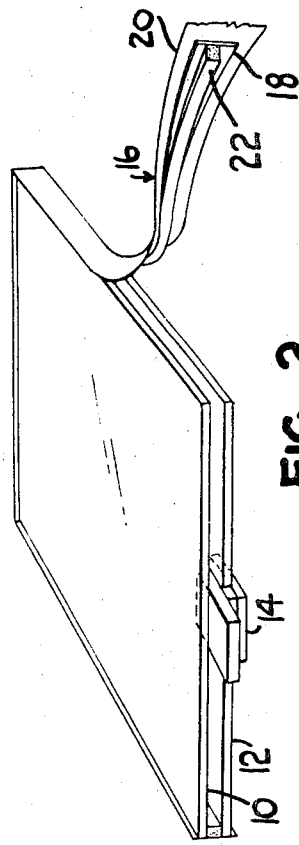
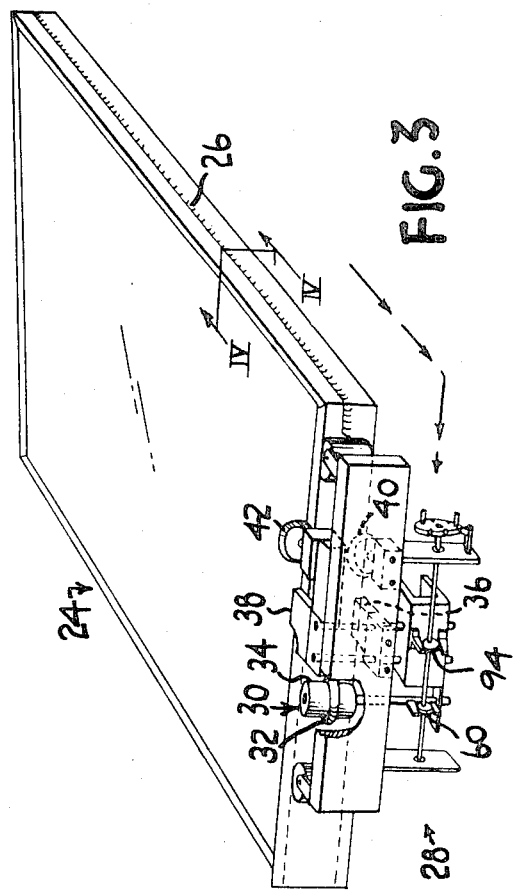
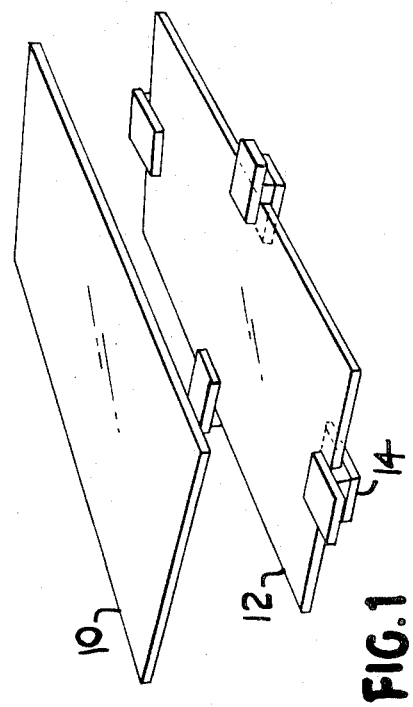
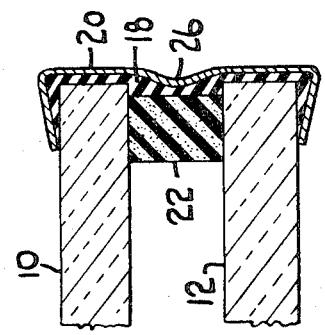

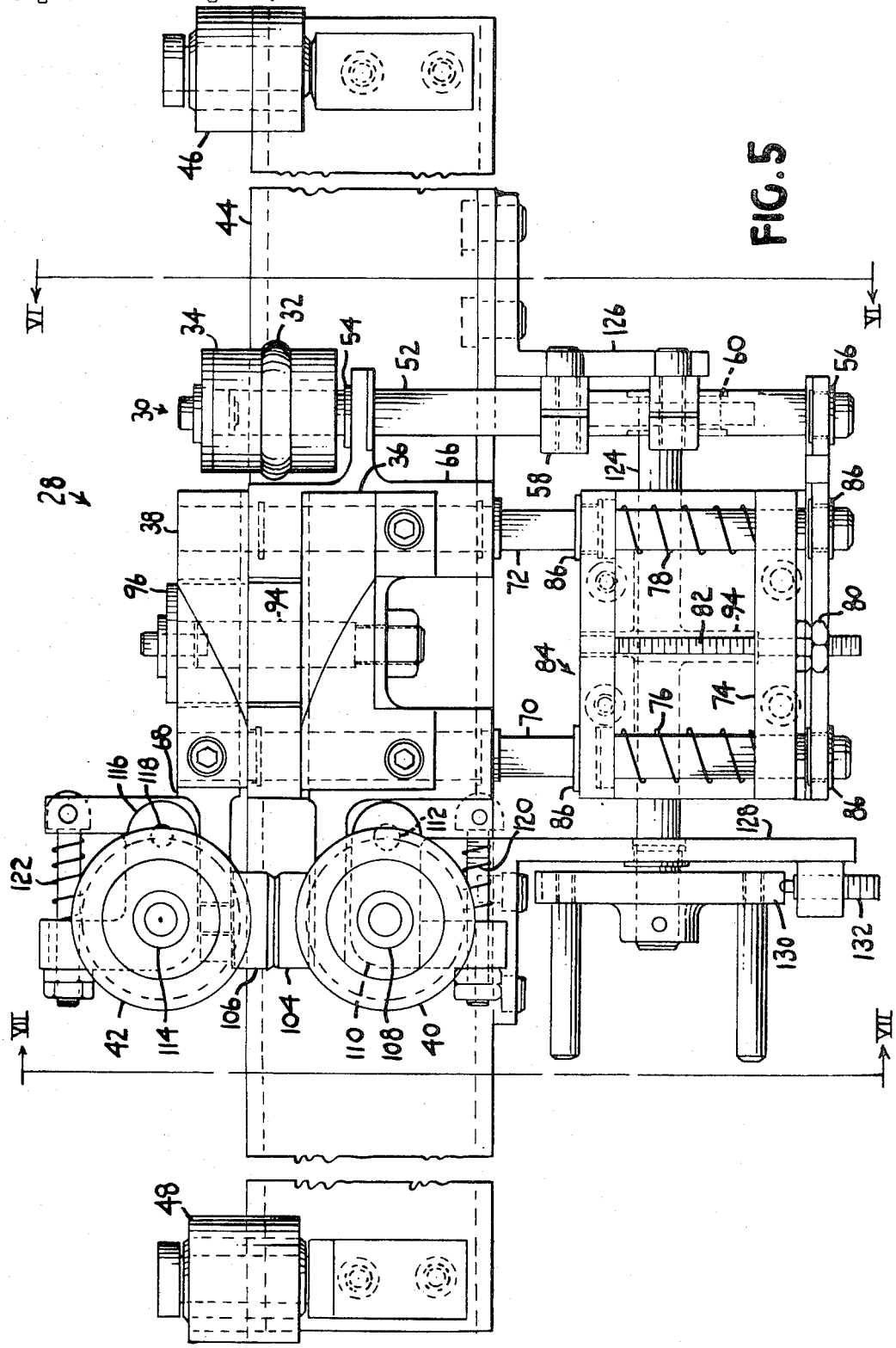

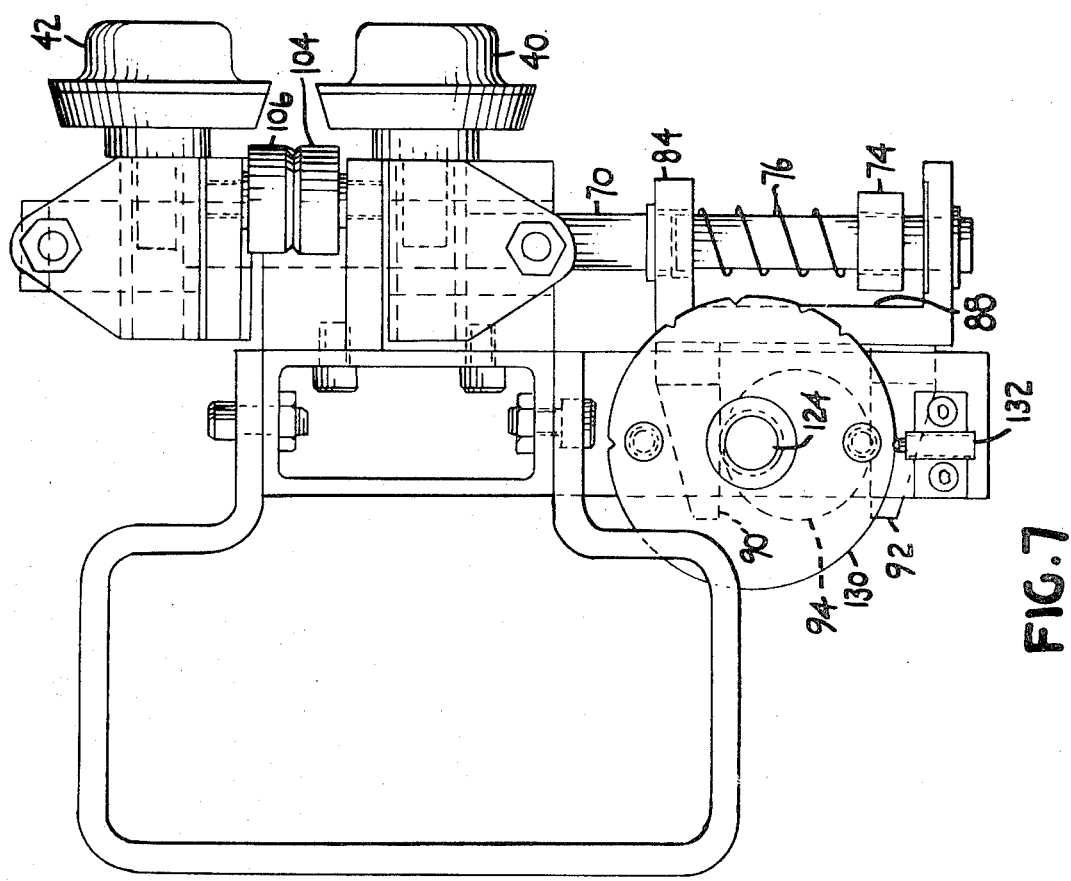
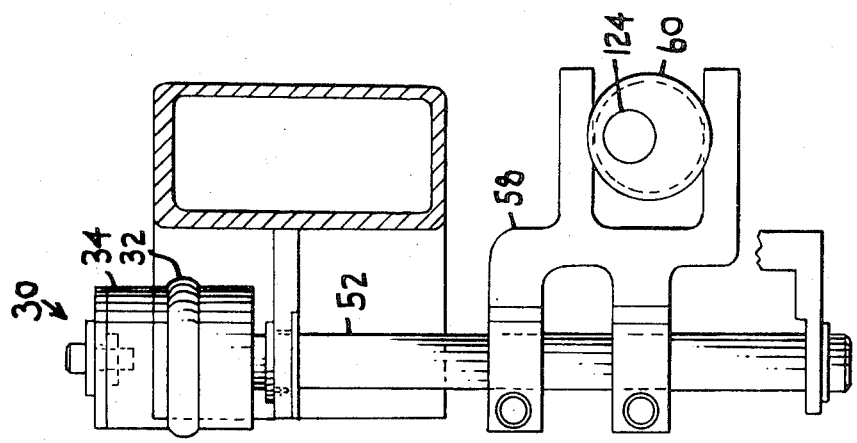

3,733,237
APPARATUS FOR MAKING HERMETICALLY SEALED GLAZING UNITS
Bernhard B. Wolff, Tarentum, Pa., assignor to PPG Industries, Inc., Pittsburgh, Pa.
Original application Aug. 19, 1970, Ser. No. 65,126, now abandoned. Divided and this application Oct. 20, 1971, Ser. No. 190,858
Int. Cl. B31f *1/00;* C03c *27/00;* E06b *3/24*
U.S. Cl. 156—468                7 Claims

ABSTRACT OF THE DISCLOSURE

Disclosed is an improved multiple glazed window unit and an improved method and apparatus for fabricating hermetically sealed glazing units comprised of a pair of spaced glass sheets separated at their marginal edges by a flexible spacer and surrounded about the perimeter by a deformable sealant covered with a flexible or non-rigid tape. In accordance with use of the preferred process and apparatus of this invention, the portions of the flexible cover tape and sealant overlying the spacer are longitudinally recessed or indented relative to lateral portions of the tape and sealant overlying the glass sheet edges.

---

This is a division, of application Ser. No. 65,126, filed Aug. 19, 1970, now abandoned.

BACKGROUND OF THE INVENTION

In commonly assigned U.S. applications, Ser. Nos. 22,762, filed Mar. 26, 1970, now Pat. No. 3,669,785, 42,712 filed June 2, 1970, now abandoned and 846,848, filed Aug. 1, 1969, now Pat. No. 3,657,900, the disclosures of which are incorporated herein by reference, there is disclosed a novel multiple glazed unit comprised of a pair of spaced glass sheets separated at their marginal edges by a flexible spacer and surrounded about the perimeter by a deformable sealant covered with a flexible or non-rigid tape. In accordance with a preferred method of assembly of the above units, a composite element comprised of an elongated strip of flowable sealant material having a wider flexible tape symmetrically adhered to one surface and a narrower flexible spacer-dehydrator element symmetrically adhered to the opposite surface is first prepared. Then a pair of cleaned glass sheets that have been pre-cut to substantially the same size are supported in horizontal, opposed, spaced relation to each other. A 45° cut or miter is thereafter made at a free end of the above-mentioned composite element and, preferably, a small piece of sealant material is applied to the mitered surface. Then, the composite tape-sealant-spacer element is applied to form the edges of the unit by inserting the spacer-dehydrator between peripheral marginal edge portions of the glass sheets while contemporaneously contacting the edge surfaces of the sheets with the wider sealant strip. At square corners, a tool is used to remove a 90° notch from the spacer-dehydrator and, at the final joint, a cut is made through the composite element to provide a 45° mitered surface matching the mitered surface produced by the initial cut. After completing this step, the edges of the assembled unit are pressed, as by roll pressing the flexible tape covering the sealant, to flow out the sealant and obtaine the desired hermetic seal.

In connection with the above method of assembly and the units produced thereby, it has been noticed that the spacer can be deflected in an unsightly and undesirable manner when the units are supported on edge. In particular, it has been noticed that when such a unit is mounted on setting blocks or resides on edge on spaced supports, there can occur an unsightly bulging of the flexible spacer immediately above such localized areas of unit support. It has been determined that the weight of the unit, when supported on edge, can cause the flexible, edge cover tape to deflect, causing the flowable or deformable sealant to transmit force, induced by the weight of the unit, to the flexible spacer and thereby deflect or push the spacer or localized portions thereof inwardly of the edge of the unit. Accordingly, the invention is directed toward developing an improved multiple glazed unit edge construction, including an improved method and apparatus for fabricating hermetically sealed glazing units comprised of a pair of spaced glass sheets separated at their marginal edges by a flexible spacer and surrounded about the perimeter by a deformable or flowable sealant covered with a flexible tape.

In accordance with the preferred process and apparatus of the invention, the portions of the flexible cover tape and sealant overlying the spacer are longitudinally recessed or indented relative to lateral portions of the tape and sealant overlying the glass sheet edges. Thus, force transmitteed to the unit by either line contact or localized or distributed planar contact across an edge of the unit is imposed on tape and sealant portions overlying load bearing, rigid glass, rather than tape and sealant portions overlying the non-load bearing flexible spacer. This arrangement substantially precludes such applied force from being transmitteed through the tape and sealant to the flexible spacer, causing the spacer to deflect in an unsightly or undesirable manner.

The foregoing and other objects, features and advantages of the present invention will become more apparent from that which follows when taken in conjunction with the drawings, in which:

FIG. 1 is a schematic, perspective view of an initial step in the process of this invention;

FIG. 2 is a schematic, perspective view of an intermediate step in the process of the invention;

FIG. 3 is a schematic, perspective view of a final step in the process of the invention, including a schematic diagram of apparatus useful for longitudinally indenting or recessing the tape and sealant portions of the unit overlying the flexible spacer, relative to lateral portions of the tape and sealant overlying the glass sheet edges. The apparatus shown also includes means for folding the cover tape and sealant over marginal surface portions of the outer facing surfaces of the glass sheets and means for pressing the folded cover tape and sealant to its final desired shape and appearance;

FIG. 4 is a typical cross section of the completed unit along line IV—IV of FIG. 3;

FIG. 5 is an elevation of a preferred apparatus of this invention, viewed from an edge of the unit during assembly;

FIG. 6 is a partical cross section along the line VI—VI of FIG. 5; and

FIG. 7 is a partial cross section along the line VII—VII of FIG. 5.

Illustrated in FIGS. 1–3 are successive step in the process of fabricating multiple glazed units in accordance with this invention. As shown in FIGS. 1 and 2, a pair of glass sheets 10 and 12 are supported in opposed, spaced relation to each other, with separators 14 providing a marginal edge spacing between the sheets which is slightly wider than the spacer element to be interposed therebetween. Then a composite spacer-sealant-tape element 16 comprised of an elongated strip of flowable, moisture-resistant sealant 18 having a wider, flexible tape 20 symmetrically adhered to one surface and a narrower, flexible, spacer-dehydrator element 22 symmetrically adhered to the opposite surface is applied to form the edges of the unit 24. This is accomplished by inserting the spacer-dehydrator 22 between peripheral marginal edge portions of the glass sheets 10 and 12, contemporaneously contacting the edge surfaces of the glass sheets with the wider strip of sealant 18 and successively removing separators 14.

As shown in FIGS. 3 and 4, after completion of the above step, the edges of the unit formed by the composite element 16 are then roll pressed, so that the tape and sealant portions overlying the flexible spacer 22 are longitudinally indented or recessed, at 26, relative to lateral portions of the tape and sealant overlying the glass sheet edges. For this purpose, apparatus or tool 28 is employed and is provided with a rotatable, laterally adjustable, nylon pressing and indenting roll 30 provided with an annular, semi-cylindrical, indenting rib 32 projecting beyond pressing surface 34. Moreover, apparatus 28 is preferably provided with a pair of laterally adjustable, nylon folding slides 36 and 38 to provide means for folding tape 20 and sealant 18 over marginal surface portions of the outer facing surfaces of the glass sheets 10 and 12. Also, apparatus 28 is preferably provided with an opposed pair of biased, conically shaped, nylon pressing rolls 40 and 42, which are laterally adjustable along with opposed folding slides 36 and 38, to provide means for pressing the folded tape 20 and sealant 18 to its final desired shape and appearance.

For use in connection with this invention, tape 20 may be composed of any flexible material, although a moisture-resistant material is preferred. In the particular embodiment shown, for example, tape 20 is a strip of 5–6 mil aluminum foil. However, a strip of flexible, moisture-resistant plastic or other flexible, moisture-resistant material may also be used, if desired.

Adhesive, moisture-resistant, deformable sealants 18, within the contemplation of this invention, are materials that are capable of cold flow at room temperature and include precured materials, such as disclosed in U.S. Pat. No. 2,974,377, as well as thermosetting and/or room temperature curable materials, such as disclosed in U.S. Pats. Nos. 3,076,777 and 3,320,333. Room temperature curable materials that cold flow to form a seal and cure to form a resilient structural bond are particularly desirable for use as an "edge-packing" or hermetic sealant in the construction of multiple glazed units. One such sealant material is fully disclosed in U.S. application Ser. No. 49,779, assigned to the assignee of this invention and the disclosure of which is intended to be incorporated herein by reference.

Spacer or spacer-dehydrator 22 is a flexible or resilient member, one preferred composition of which is fully disclosed in the aforementioned application Ser. No. 42,712. Briefly, spacer-dehydrator 22 is preferably comprised of a powdered molecular sieve material dispersed in a matrix of a thermoplastic, moisture vapor transmittable, styrene-butadiene rubber, such as now disclosed in U.S. Pat. No. 3,265,765. Reference may be had to the aforesaid application Ser. No. 42,712 for further details regarding spacer-dehydrator 22, its method of manufacture and ultimate use in multiple glazed window constructions.

Referring now in greater detail to the apparatus of FIGS. 3 and 5–7, there is shown a preferred construction of a hand-held tool or apparatus 28 suitable for performing the desired pressing and indenting, folding and press-finishing operations of the invention. As shown, tool or apparatus 28 is comprised of a base or bracket 44 with a guide roll 46 rotatably mounted near its leading end and a guide roll 48 rotatably mounted near its trailing end. Leading guide roll 46 is followed by the pressing and indenting roll 30, which is preferably made of nylon. Pressing and indenting roll 30 is mounted for rotation on a shaft 52 which is laterally reciprocable in bearings 54 and 56 by means of yoke 58, fixed to shaft 52, and eccentric cam 60.

Following pressing and indenting roll 30 are the pair of opposed folding slides 36 and 38 which are also preferably made of nylon. Folding slide 36 is fixed to bracket 66 which, in turn, is fixed to base 44. Folding slide 38 is fixed to bracket 68, which is laterally reciprocable relative to base 44 by means of shafts 70 and 72 being fixed thereto and to bar 74. Bar 74 is biased by springs 76 and 78 against stop nuts 80 carried on threaded rod 82 which, in turn, passes freely through an aperture in bar 74 and is threadably secured to C-shaped bracket 84. C-shaped bracket 84 is provided with bearings 86 such that shafts 70 and 72 can be reciprocated relative thereto. Mounted on the web portion 88 of C-shaped bracket 84 are a pair of laterally opposed, spaced flanges 90 and 92 which provide a yoke with web 88 for an eccentric cam 94. Folding slides 36 and 38, as will be well understood by those skilled in the art, are provided with suitably generated, curvilinear surfaces of opposite hand to gradually fold the edge portions of tape 20 and sealant 18 90° onto the marginal surface portions of the outer facing surfaces of the glass sheets 10 and 12 as the tool 28 moves toward the right as shown in FIG. 5. Also shown in FIG. 5 is an edge back-up roll 96 mounted for rotation on shaft 94 fixed to bracket 66.

Next following the folding slides 36 and 38 are a pair of opposed conical pressing rolls 40 and 42, also preferably composed of nylon, and a pair of edge back-up rolls 104 and 106 mounted at 90° to the conical pressing rolls. Conical pressing rolls 40 and 42 give a final sloping chamfer to the edge portions of the previously folded-over tape and sealant, providing the finished appearance shown in FIG. 4. Conical pressing roll 40 is mounted for rotation about shaft 108 fixed to a clevis 110 mounted for limited arcuate movement about pin 112 fixed to bracket 66. Similarly, conical pressing roll 42 is mounted for rotation about shaft 114 fixed to a clevis 116 mounted for limited arcuate movement about pin 118 fixed to bracket 68. Springs 120 and 122 are provided to bias conical pressing rolls 40 and 42 toward their position shown in FIGS. 5 and 7. Spring biasing by means of springs 120 and 122 and springs 76 and 78, in addition to providing desired pressure, permits the pressing rolls 40 and 42 and the folding slide 38 to adjust to slight differences in unit thickness.

Finally, eccentric cams 60 and 94 are fixed to a shaft 124 mounted for rotation in brackets 126 and 128. Shaft 124 has a notched disc 130 fixed on one end contacting a spring-loaded plunger or detent 132. The rotation of disc 130 causes eccentric cams 60 and 94 to move pressing and indenting roll 30 and bracket 68. Eccentric cams 60 and 94 are constructed such that, for any given degree of rotation of shaft 124, pressing and indenting roll 30 moves one-half the distance that bracket 68 moves. Accordingly, pressing and indenting roll 30, which is initially centered on the space between folding slides 36 and 38, always remains centered on this space. Obviously, the locations of the notches in the edge of disc 130 are predetermined to correspond with a number of standard unit thicknesses for which the tool is designed to be used.

Although the present invention has been described with particular reference to specific details of certain embodiments thereof, it is not intended that such details shall be regarded as limitations upon the scope of the invention except insofar as included in the accompanying claims.

I claim:

1. Apparatus for finishing the edges of a multiple glazed unit comprised of a pair of rigid sheets separated at their marginal edges by a flexible spacer and surrounded about the perimeter by a deformable sealant covered with a flexible tape, which comprises a base support, means mounted on said support to longitudinally recess tape and sealant portions overlying said spacer relative to lateral portions of said tape and sealant overlying the edges of said rigid sheets, means to then press said lateral portions of said tape and sealant overlying the edges of said rigid sheets against said edges, means following said last-mentioned means for folding edge portions of said tape and sealant over marginal surface portions of the outer facing surfaces of said sheets and means for thereafter pressing said tape and sealant portions which are folded over said marginal surface portions of the outer facing surfaces of said rigid sheets against said outer facing surfaces.

2. The apparatus of claim 1 wherein said means to longitudinally recess tape and sealant portions overlying said spacer comprises a rotatable roll provided with an annular, semi-cylindrical rib projecting beyond the cylindrical surface of said roll.

3. The apparatus of claim 2 wherein said means for folding said tape and sealant over marginal surface portions of the outer facing surfaces of said sheets comprises a pair of laterally opposed folding slides, each provided with a curvilinear surface of opposite hand to gradually fold edge portions of said tape and sealant over said marginal surface portions of the outer facing surfaces of said sheets.

4. The apparatus of claim 3 wherein said means for pressing said tape and sealant which is folded over said marginal surface portions of the outer facing surfaces of said rigid sheets comprises an opposed pair of rotatable, conically-shaped pressing rolls.

5. The apparatus of claim 4 wherein said recessing roll is laterally adjustable relative to said support.

6. The apparatus of claim 3 wherein one of said folding slides is laterally adjustable along with one of said pressing rolls in the same direction relative to said support.

7. The apparatus of claim 5 which further includes means to laterally adjust said recessing roll in the same direction as said one of said folding slides and said one of said pressing rolls so that said recessing roll is moved one-half the distance that said one of said folding slides and said one of said pressing rolls are moved.

References Cited
UNITED STATES PATENTS

| | | | |
|---|---|---|---|
| 3,473,988 | 10/1969 | Rullier et al. | 156—109 X |
| 1,931,924 | 10/1933 | Denmire | 156—468 X |
| 2,708,774 | 5/1955 | Seelen | 161—45 |
| 2,281,064 | 4/1942 | Englehart | 52—172 |
| 2,974,377 | 3/1961 | Kunkle | 52—172 X |

PHILIP DIER, Primary Examiner

U.S. Cl. X.R.

52—172, 309, 397; 156—107, 109; 161—45